US012608429B2

(12) United States Patent
Sarir et al.

(10) Patent No.: US 12,608,429 B2
(45) Date of Patent: Apr. 21, 2026

(54) DYNAMIC USER INTERFACE FOR NAVIGATING USER ACCOUNT DATA

(71) Applicant: The Toronto-Dominion Bank, Toronto (CA)

(72) Inventors: Nasim Sarir, Thornhill (CA); Mei Hu, Mississauga (CA); Yanfang Zhang, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/310,569

(22) Filed: May 2, 2023

(65) Prior Publication Data

US 2023/0273963 A1 Aug. 31, 2023

Related U.S. Application Data

(63) Continuation of application No. 16/592,851, filed on Oct. 4, 2019, now Pat. No. 11,687,601.

(51) Int. Cl.
*G06F 16/951* (2019.01)
*G06F 16/2457* (2019.01)
(Continued)

(52) U.S. Cl.
CPC ...... *G06F 16/951* (2019.01); *G06F 16/24578* (2019.01); *G06F 16/248* (2019.01);
(Continued)

(58) Field of Classification Search
CPC ............. G06F 16/951; G06F 16/24578; G06F 16/248; G06F 16/3322; G06F 16/9535; H04L 67/306
(Continued)

(56) References Cited

U.S. PATENT DOCUMENTS 7,729,920 B2 6/2010 Chaar et al.
8,073,812 B2 12/2011 Curtis
(Continued)

OTHER PUBLICATIONS

Microsoft Computer Dictionary, 5th Edition, Microsoft Press, Redmond, WA, © 2002, pp. 141, 145 and 442-443.*
(Continued)

*Primary Examiner* — Robert Stevens
(74) *Attorney, Agent, or Firm* — Rowand LLP

(57) ABSTRACT

A processor-implemented method is disclosed. The method may include: performing a first data transfer for transferring data from a user account to a recipient account; updating an interaction model for the user account based on the first data transfer, the interaction model including definitions of user intents associated with account operations that are initiated in connection with the user account and arguments associated with the user intents, and wherein updating the interaction model comprises: configuring the interaction model to support at least one of a new user intent for transferring data from the user account or a new argument for an existing user intent defined in the interaction model; receiving, from a client device associated with the user account, a query having at least one query term; determining, based on the updated interaction model and the at least one query term, that the query maps to a user intent, defined in the updated interaction model, that is associated with the first data transfer; and in response to determining that the query maps to the user intent associated with the first data transfer, providing, to the client device for display thereon, an actionable search result for initiating a second account operation based on the first data transfer.

20 Claims, 8 Drawing Sheets

(51) Int. Cl.
    *G06F 16/248*         (2019.01)
    *G06F 16/332*         (2025.01)
    *G06F 16/9535*      (2019.01)
    *H04L 67/306*        (2022.01)

(52) U.S. Cl.
    CPC ...... *G06F 16/3322* (2019.01); *G06F 16/9535*
                  (2019.01); *H04L 67/306* (2013.01)

(58) Field of Classification Search
    USPC ........................................................ 707/723
    See application file for complete search history.

(56)              References Cited

U.S. PATENT DOCUMENTS

| | | | | |
|---|---|---|---|---|
| 8,082,196 | B2 * | 12/2011 | Mullan | G06Q 40/02 |
| | | | | 705/35 |
| 8,442,973 | B2 | 5/2013 | Cramer et al. | |
| 8,468,469 | B1 | 6/2013 | Mendis et al. | |
| 8,706,503 | B2 | 4/2014 | Cheyer et al. | |
| 9,824,408 | B2 * | 11/2017 | Isaacson | G06Q 10/40 |
| 10,198,451 | B2 | 2/2019 | Prahlad et al. | |
| 10,554,817 | B1 | 2/2020 | Sullivan | |
| 10,685,355 | B2 * | 6/2020 | Novick | G06Q 20/10 |
| 10,839,432 | B1 | 11/2020 | Konig | |
| 11,682,070 | B2 * | 6/2023 | Hockey | G06F 16/951 |
| | | | | 705/35 |
| 11,756,020 | B1 * | 9/2023 | Stipech | G06F 3/0486 |
| | | | | 705/41 |
| 11,763,333 | B2 * | 9/2023 | Lange | G06Q 30/0224 |
| | | | | 705/14.25 |

| | | | | |
|---|---|---|---|---|
| 2002/0111907 | A1 * | 8/2002 | Ling | G06Q 20/28 |
| | | | | 705/41 |
| 2011/0306426 | A1 | 12/2011 | Novak et al. | |
| 2013/0166332 | A1 * | 6/2013 | Hammad | G06Q 20/12 |
| | | | | 705/28 |
| 2014/0337175 | A1 * | 11/2014 | Katzin | G06Q 20/326 |
| | | | | 705/26.62 |
| 2015/0169285 | A1 | 6/2015 | Reyes et al. | |
| 2015/0379554 | A1 | 12/2015 | Copeland | |
| 2016/0125369 | A1 | 5/2016 | Grassadonia et al. | |
| 2016/0125371 | A1 | 5/2016 | Grassadonia | |
| 2017/0236196 | A1 * | 8/2017 | Isaacson | G06Q 20/12 |
| | | | | 705/14.51 |
| 2017/0242886 | A1 | 8/2017 | Jolley et al. | |
| 2018/0005323 | A1 * | 1/2018 | Grassadonia | G06Q 40/02 |
| 2019/0026781 | A1 * | 1/2019 | Beck | G06Q 20/3224 |
| 2019/0095506 | A1 * | 3/2019 | Challagolla | G06F 16/254 |
| 2019/0266288 | A1 | 8/2019 | Shukla | |
| 2020/0213127 | A1 * | 7/2020 | Maniyar | G06F 16/2379 |

OTHER PUBLICATIONS

IEEE 100: The Authoritative Dictionary of IEEE Standards Terms, 7th Edition, IEEE Press, New York, NY, Dec. 2000, pp. 268, 273 and 936.*

Meiappane, A., et al., "Request and Notification Pattern for an Internet Banking System", IJCSITR, vol. 1, Issue 1, Oct.-Dec. 2013, pp. 1-8.*

Fent, Alfred, et al., "Logical Update Queries as Open Nested Transactions", TDD '99, LNCS 1773, 8th International Workshop on Foundations of Models and Languages for Data and Objects, Dagstuhl Castle, Germany, Sep. 27-30, 1999, pp. 45-66.*

* cited by examiner

150

140

Resource Server

180

Application Server

Network
120

110

100

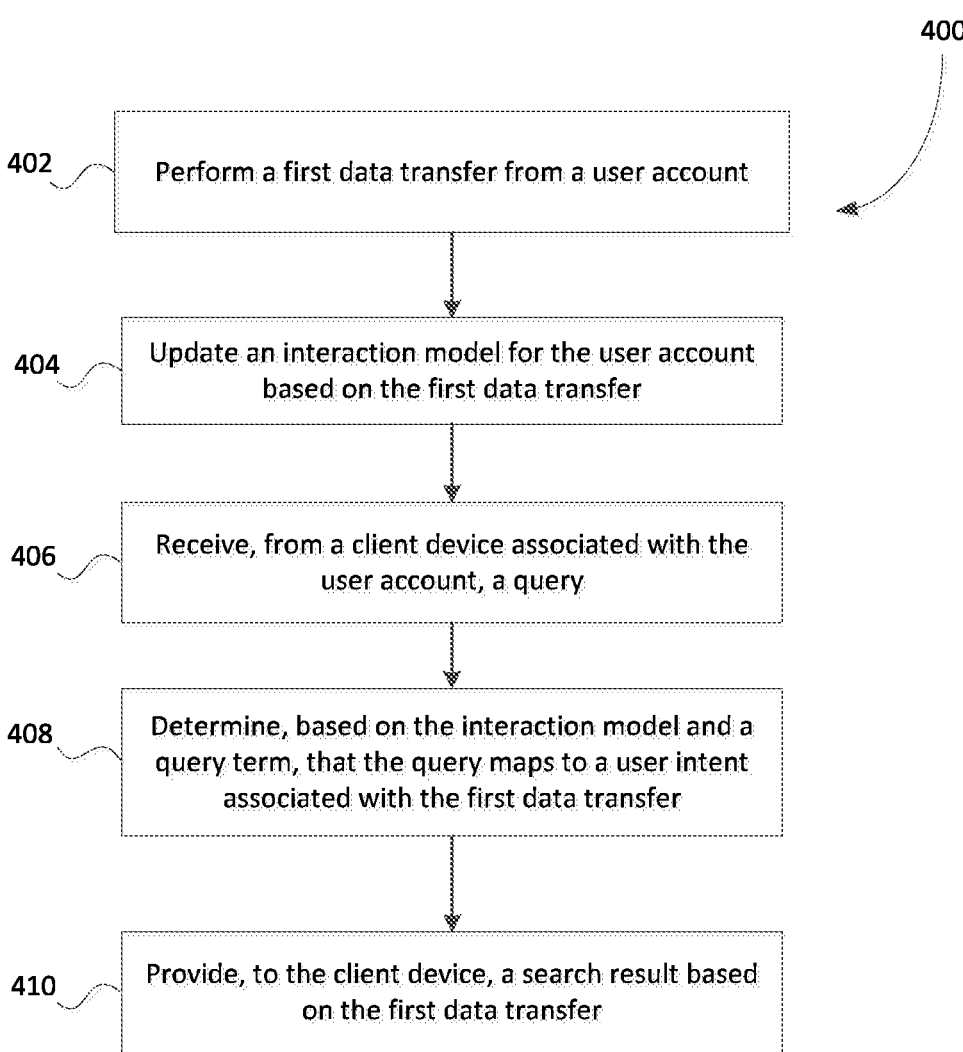

400

402 — Perform a first data transfer from a user account

404 — Update an interaction model for the user account based on the first data transfer 406 — Receive, from a client device associated with the user account, a query 408 — Determine, based on the interaction model and a query term, that the query maps to a user intent associated with the first data transfer 410 — Provide, to the client device, a search result based on the first data transfer

502 — Perform a first data transfer from a user account

504 — Identify at least one parameter associated with the first data transfer

506 — Determine, based on the at least one parameter, that the first data transfer is relevant to a first summary of user account data 508 — Update the first summary of user account data based on the first data transfer

600

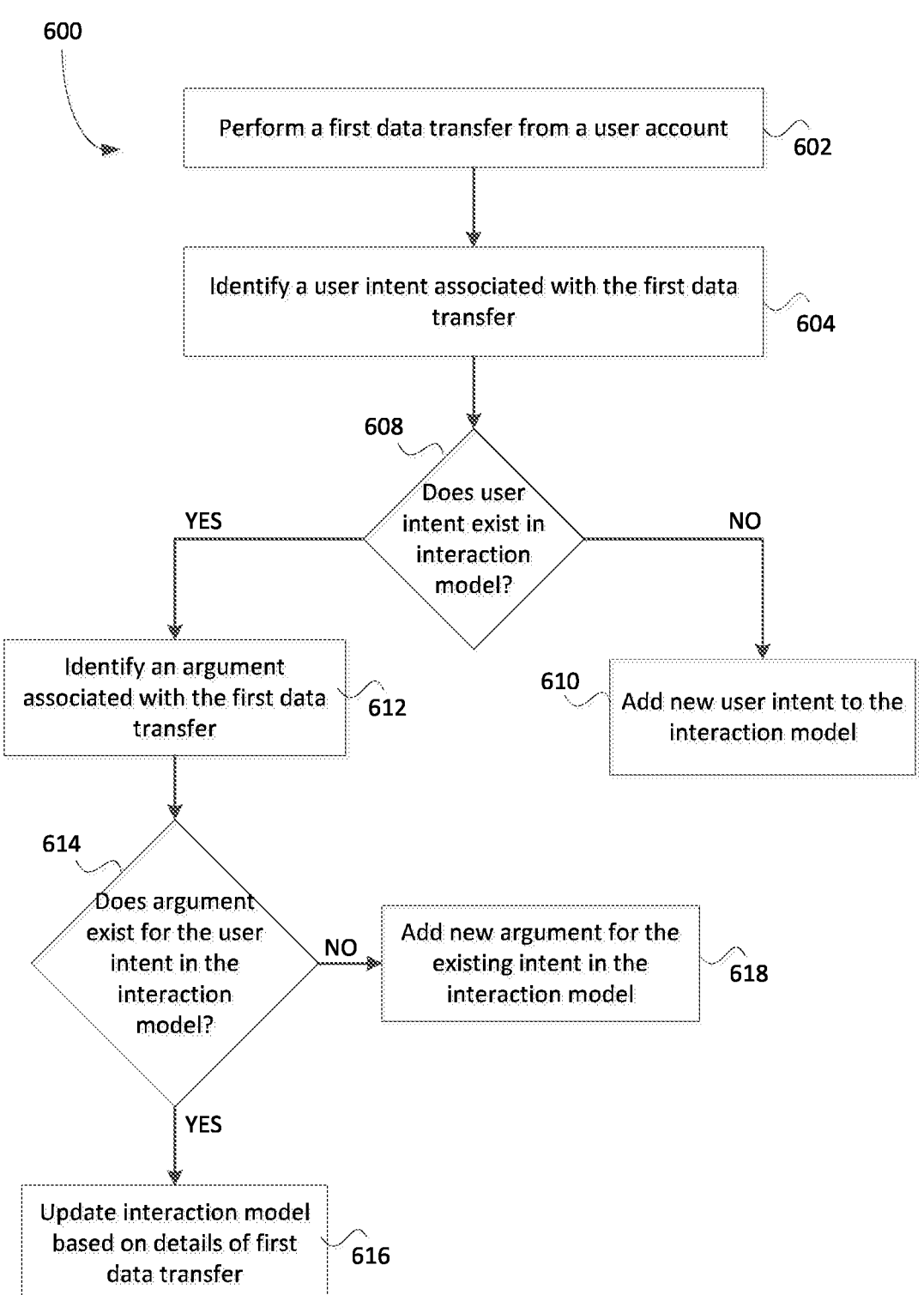

Perform a first data transfer from a user account          602

Identify a user intent associated with the first data transfer          604

608

Does user intent exist in interaction model?

YES                                                  NO

Identify an argument associated with the first data transfer          612

610          Add new user intent to the interaction model

614

Does argument exist for the user intent in the interaction model?          NO          Add new argument for the existing intent in the interaction model          618

YES

Update interaction model based on details of first data transfer          616

FIG. 6

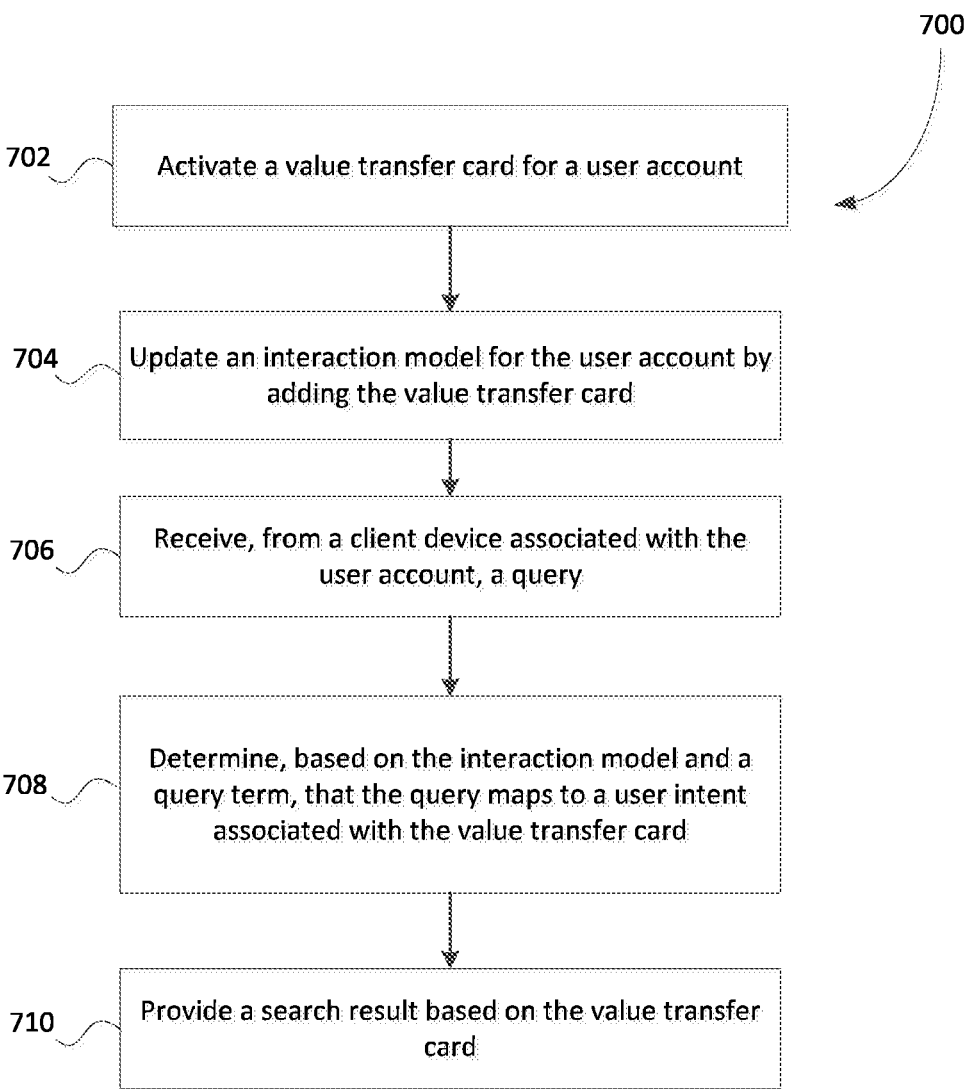

700

702 — Activate a value transfer card for a user account

704 — Update an interaction model for the user account by adding the value transfer card 706 — Receive, from a client device associated with the user account, a query 708 — Determine, based on the interaction model and a query term, that the query maps to a user intent associated with the value transfer card 710 — Provide a search result based on the value transfer card

FIG. 7

DYNAMIC USER INTERFACE FOR NAVIGATING USER ACCOUNT DATA

CROSS-REFERENCE TO RELATED APPLICATION

The present application is a continuation of U.S. patent application Ser. No. 16/592,851 filed on Oct. 4, 2019, the contents of which are herein incorporated by reference in their entirety.

TECHNICAL FIELD

The present disclosure relates to user interfaces and, in particular, to systems and methods for providing dynamic user interfaces for navigating user account data. The present disclosure also relates to methods of processing queries for user account data and providing results of such queries to end users.

BACKGROUND

Various applications may be used to view, edit, or otherwise access private user account data. For example, a banking application allows users to obtain account balance information and conduct various financial transactions, such as bill payments, cheque deposits, and money transfers. The user interfaces of such applications may not be conducive to effectively navigating user account data. An application may, for example, be designed for linear user flow, in which application interaction goals (e.g. transfer money to a recipient) define a specific beginning, middle, and end that allows users to complete one action with each step. A linear navigation design for an application may sometimes lead to repeated user actions, longer transaction times, and limited scope of user interaction. It is desirable to simplify the navigation interface of an application in order to provide a better overall user experience.

BRIEF DESCRIPTION OF THE DRAWINGS

Reference will now be made, by way of example, to the accompanying drawings which show example embodiments of the present application and in which:

FIG. 4 shows, in flowchart form, an example method for providing a dynamic user interface for navigating user account data;

FIG. 6 shows, in flowchart form, another example method for providing a dynamic user interface for navigating user account data;

FIG. 7 shows, in flowchart form, another example method for providing a dynamic user interface for navigating user account data.

Like reference numerals are used in the drawings to denote like elements and features.

DETAILED DESCRIPTION OF EXAMPLE EMBODIMENTS

Figure 1:
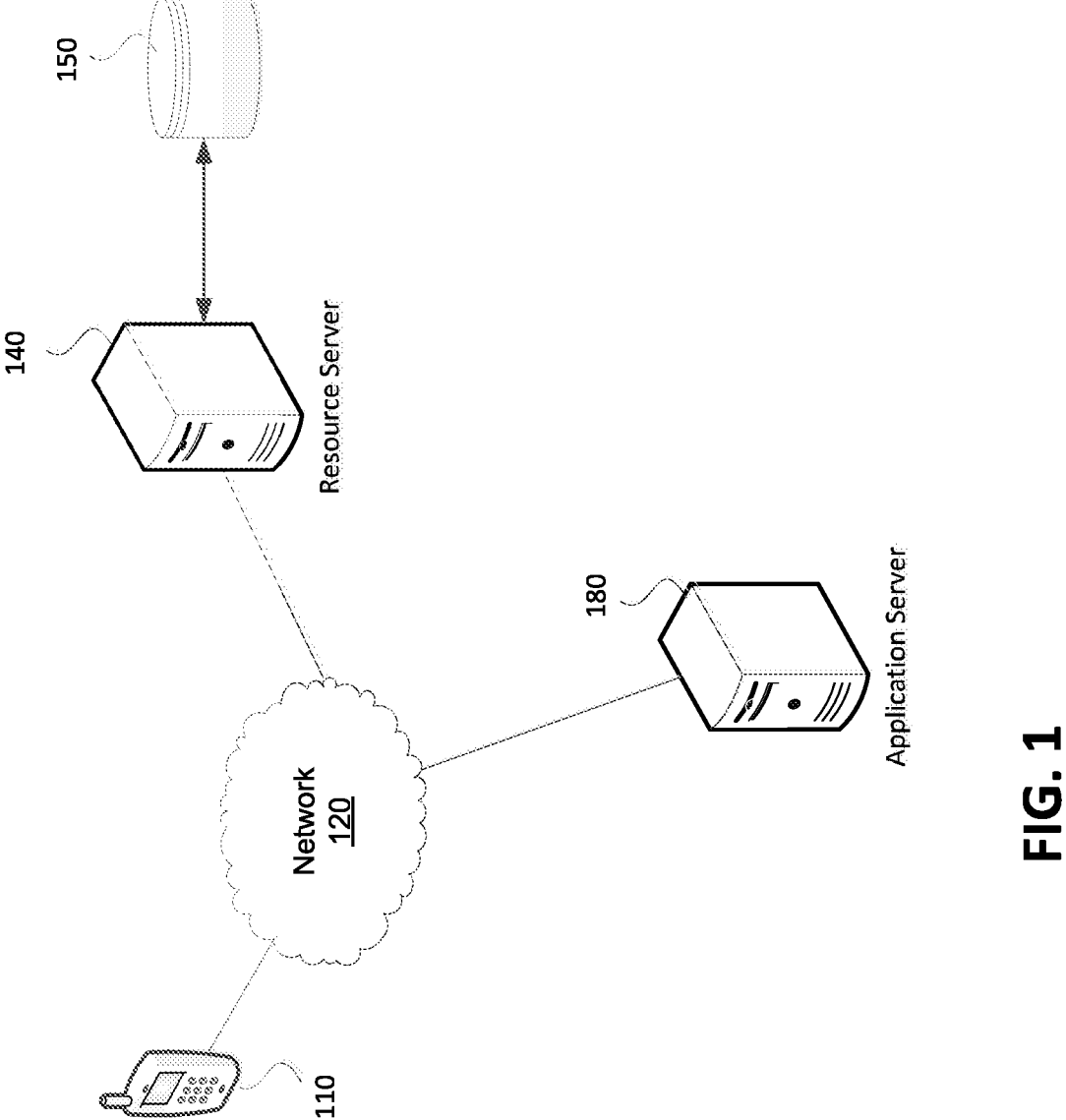
FIG. 1 is a schematic operation diagram illustrating an operating environment of an example embodiment.

In an aspect, the present disclosure describes a computing system. The computing system includes a communications module communicable with an external network, a memory, and a processor coupled to the communications module and the memory. The processor is configured to: perform a first data transfer from a user account; update an interaction model for the user account based on the first data transfer; receive, from a client device associated with the user account, a query having at least one query term; determine, based on the interaction model and the at least one query term, that the query maps to a user intent associated with the first data transfer; and in response to determining that the query maps to a user intent associated with the first data transfer, provide, to the client device, a search result based on the first data transfer.

In some implementations, updating the interaction model for the account may comprise: identifying, based on the first data transfer, a new user intent or a new argument for an existing user intent for the interaction model; and configuring the interaction model to support the new user intent or the new argument.

In some implementations, the new user intent or the new argument may indicate a recipient associated with the first data transfer.

In some implementations, the search result may be an actionable option to perform a second data transfer to a recipient associated with the first data transfer.

In some implementations, the search result may include a transfer history summary for transfers to a recipient associated with the first data transfer.

In some implementations, the query may indicate a time period and wherein the transfer history summary is associated with the time period.

In some implementations, the input may be received via a free-form search box displayed on the client device.

In some implementations, the client device may be a smart speaker.

In some implementations, the processor may be further configured to: activate a value transfer card; update the interaction model for the account based on the value transfer card; receive, from the client device, a further input representing a further query having at least one query term; determine, based on the interaction model and the at least one query term of the further query, that the further query maps to a user intent associated with the value transfer card; and in response to determining that the further query maps to a user intent associated with the value transfer card, provide a search result based on the value transfer card.

In some implementations, updating the interaction model for the account based on the value transfer card may comprise adding support for a user intent to lock the value transfer card and the search result may be a selectable option to lock the value transfer card.

In another aspect, the present disclosure describes a method for providing a dynamic user interface for navigating user account data. The method includes: performing a first data transfer from a user account; updating an interaction model for the user account based on the first data transfer; receiving, from a client device associated with the user account, a query having at least one query term; determining, based on the interaction model and the at least one query term, that the query maps to a user intent associated with the first data transfer; and in response to determining that the query maps to a user intent associated with the first data transfer, providing, to the client device, a search result based on the first data transfer.

In an aspect, a computing system is disclosed. The computing system includes a processor and a memory coupled to the processor. The memory stores processor-executable instructions that, when executed by the processor, may cause the processor to: perform a first data transfer for transferring data from a user account to a recipient account; update an interaction model for the user account based on the first data transfer, the interaction model including definitions of user intents associated with account operations that are initiated in connection with the user account and arguments associated with the user intents, and wherein updating the interaction model comprises: configuring the interaction model to support at least one of a new user intent for transferring data from the user account or a new argument for an existing user intent defined in the interaction model; receive, from a client device associated with the user account, a query having at least one query term; determine, based on the updated interaction model and the at least one query term, that the query maps to a user intent, defined in the updated interaction model, that is associated with the first data transfer; and in response to determining that the query maps to the user intent associated with the first data transfer, provide, to the client device for display thereon, an actionable search result for initiating a second account operation based on the first data transfer.

In some implementations, the new user intent or the new argument may indicate a recipient associated with the first data transfer.

In some implementations, the search result may include a transfer history summary for transfers to a recipient associated with the first data transfer.

In some implementations, the query may indicate a time period and the transfer history summary may be associated with the time period.

In some implementations, input of the query may be received via a free-form search box displayed on the client device.

In some implementations, the client device may include a smart speaker.

In some implementations, the instructions, when executed, may further cause the processor to: activate a value transfer card; update the interaction model for the account based on the value transfer card; receive, from the client device, a further input representing a further query having at least one query term; determine, based on the interaction model and the at least one query term of the further query, that the further query maps to a user intent associated with the value transfer card; and in response to determining that the further query maps to a user intent associated with the value transfer card, provide a search result based on the value transfer card.

In some implementations, updating the interaction model for the account based on the value transfer card may include adding support for a user intent to lock the value transfer card and the search result may be a selectable option to lock the value transfer card.

In some implementations, the second account operation may include a data transfer from the user account to the recipient account.

In some implementations, configuring the interaction model may include adding one or more parameters associated with the first data transfer as arguments for a user intent of the interaction model.

In another aspect, a processor-implemented method is disclosed. The method may include: performing a first data transfer for transferring data from a user account to a recipient account; updating an interaction model for the user account based on the first data transfer, the interaction model including definitions of user intents associated with account operations that are initiated in connection with the user account and arguments associated with the user intents, and wherein updating the interaction model comprises: configuring the interaction model to support at least one of a new user intent for transferring data from the user account or a new argument for an existing user intent defined in the interaction model; receiving, from a client device associated with the user account, a query having at least one query term; determining, based on the updated interaction model and the at least one query term, that the query maps to a user intent, defined in the updated interaction model, that is associated with the first data transfer; and in response to determining that the query maps to the user intent associated with the first data transfer, providing, to the client device for display thereon, an actionable search result for initiating a second account operation based on the first data transfer.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Applications, including mobile or cloud-based applications, that are available on user devices make it easier to access the account data of remotely hosted user accounts. Using an application on their device, an authorized user may authenticate to a remote service (e.g. a bank server) hosting their account and request to view, edit, or otherwise access account data for the account. Such applications may enable users to perform various different account operations. For example, a banking application may allow users to monitor personal bank account information, such as account balances and transactions history, and also to conduct financial transactions, such as cheque deposits, bill payments, and money transfers.

The user interface design of these applications for accessing user account data have a significant impact on the overall user experience. Applications that incorporate linear navigation provide users with clear, straightforward guidance as to what actions to take in each step towards an application interaction goal. Such linear user flow design may not be optimal for applications that are used for accessing account data and conducting transactions in real-time—these applications would tend to favour speed and efficiency of account operations over linearity of navigation. A linear navigation design may, for example, lead to repeated user actions, longer transaction times, and limited scope of user interaction.

The present disclosure describes dynamic user interfaces of applications for navigating user account data. In particular, user experience (UX) design which is adaptive to individual users of the applications is disclosed. An adaptive user interface design may provide users with expedient access to application content and account operations that are most relevant for those users. The user interfaces of the present disclosure are designed to integrate with interaction models. An interaction model for a user account is used to model a user's behavior when interacting with the user account. Generally, an interaction model for a user account is built based on account operations and/or user preferences. By integrating interaction models, user interfaces may be dynamically updated with account operations and user preferences data as users navigate their account data.

In some embodiments of the present disclosure, application user interfaces provide a query functionality which facilitates navigation of user account data. Using the query functionality, an individual user can search for account information and application actions which are relevant to the user's specific commands or queries. In particular, the query functionality may be personalized using an interaction model for a user account, for better responsiveness to user behavior and preferences. Specifically, the results returned by the query functionality may reflect updates to the interaction model for a user account. For example, account operations for a user account may cause an interaction model for the user account to be updated, and results of subsequent queries to the application user interface may be based on the updated interaction model. The query functionality may allow users to circumvent a multi-step, linear progression towards an application interaction goal, thereby improving on speed and efficiency of user interaction. By connecting the query functionality to a dynamically updated interaction model, the user interface may offer better suggestions for search results and/or application actions, while economizing on processing times for user queries.

FIG. 1 is a schematic diagram of an exemplary operating environment in accordance with embodiments of the present disclosure. FIG. 1 illustrates exemplary components of a system 100, including one or more client devices 110, a resource server 140, a protected data resource 150, and an application server 180. The components of system 100 may be configured to provide, in conjunction, various functionalities including, among others, access control and navigation of user account data associated with the protected data resource 150.

As illustrated, a resource server 140 and client device 110 communicate via the network 120. The client device 110 is a computing device that may be associated with an entity, such as a user or client, having resources associated with the resource server 140 and/or the protected data resource 150. For example, the resource server 140 may track, manage, maintain, and/or lend resources to the entity. The resources may, for example, be computing resources, such as memory or processor cycles. By way of further example, the resources may comprise stored value, such as fiat currency, which may be represented in the protected data resource 150.

The resource server 140 is coupled to the protected data resource 150, which may be provided in secure storage. The secure storage may be provided internally within the resource server 140 or externally. In some embodiments, the secure storage may be provided remotely from the resource server 140. For example, the secure storage may include one or more data centers. The data centers may, for example, store data with bank-grade security.

The resource server 140, cooperatively with the protected data resource 150, is configured to provide a navigation functionality for user account data stored in the protected data resource 150. Specifically, the resource server 140 may receive queries via one or more applications on the client devices 110 and conduct searches of the users' accounts for the requested data. The results of the searches may be provided to the client devices via the navigation interfaces of the applications. As will be described in greater detail below, the resource server 140 may enable dynamic navigation interfaces for applications that are used to access user account data at the protected data resource 150.

The protected data resource 150 stores secure data. In particular, the protected data resource 150 may include records for a plurality of accounts associated with various entities. That is, the secure data may comprise account data for one or more specific entities. For example, an entity that operates the client device 110 may be associated with an account having one or more records in the protected data resource 150. In at least some embodiments, the records may reflect a quantity of stored resources that are associated with an entity. Such resources may include owned resources and/or borrowed resources (e.g. resources available on credit). The quantity of resources that are available to or associated with an entity may be reflected by a balance defined in an associated record.

For example, the secure data in the protected data resource 150 may include financial data, such as banking data (e.g. bank balance, historical transactions data identifying transactions such as debits from and credits to an account, etc.) for an entity. In particular, the resource server 140 may be a financial institution (e.g. bank) server and the entity may be a customer of the financial institution which operates the financial institution server. The financial data may, in some embodiments, include processed or computed data such as, for example, an average balance associated with an account, an average spending amount associated with an account, a total spending amount over a period of time, or other data obtained by a processing server based on account data for the entity.

The secure data may include personal data, such as personal identification information. The personal identification information may include any stored personal details associated with an entity including, for example, a home, work or mailing address, contact information such as a messaging address (e.g. email address), and/or a telephone number, a government-issued identifier such as a social insurance number (SIN) and/or driver's license number, date of birth, age, etc.

In some embodiments, the protected data resource 150 may be a computer system that includes one or more database servers, computer servers, and the like. In some embodiments, the protected data resource 150 may comprise an application programming interface (API) for a web-based system, operating system, database system, computer hardware, or software library.

The client device 110 may be used, for example, to configure a data transfer from an account associated with the client device 110. More particularly, the client device 110 may be used to configure a data transfer from an account associated with an entity operating the client device 110. The data transfer may involve a transfer of data between a record in the protected data resource 150 associated with such an account and another record in the protected data resource 150 (or in another data resource such as a database associated with a different server, not shown, provided by another financial institution, for example). The other record is associated with a data transfer recipient such as, for example, a bill payment recipient. The data involved in the transfer may, for example, be units of value and the records involved in the data transfer may be adjusted in related or corresponding manners. For example, during a data transfer, a record associated with the data transfer recipient may be adjusted to reflect an increase in value due to the transfer, whereas the record associated with the entity initiating the data transfer may be adjusted to reflect a decrease in value which is at least as large as the increase in value applied to the record associated with the data transfer recipient.

The system 100 includes at least one application server 180. The application server 180 may be associated with a third-party application (such as a web or mobile application) that is resident on the client device 110. In particular, the application server 180 connects the client device 110 to a back-end system associated with the third-party application. The capabilities of the application server 180 may include, among others, user management, data storage and security, transaction processing, resource pooling, push notifications, messaging, and off-line support of the third-party application. As illustrated in FIG. 1, the application server 180 may be connected to the client device 110 and the resource server 140 via the network 120. In some embodiments, the resource server 140 may itself serve as an application server for an application. In particular, the resource server 140 may provide back-end services associated with one or more applications on the client device 110.

The application server 180 may provide a third-party application that utilizes secure data associated with the protected data resource 150. For example, the application server 180 may provide a personal financial management (PFM) application that utilizes financial data stored in a protected database. When the third-party application requires access to the secure data for one or more of its functionalities, the application server 180 may communicate with the resource server 140 over the network 120. For example, the resource server 140 may provide an application programming interface (API) or another interface which allows the application server 180 to obtain secure data associated with a particular entity (such as a user having an account at the protected data resource 150).

Such access to secure data may only be provided to the application server 180 with the consent of the entity that is associated with the data. For example, the client device 110 may be adapted to receive a signal indicating a user's consent to share data with the application server 180 and may, in response, send an indication of consent to the resource server 140. The resource server 140 may then configure data sharing with the application server 180. For example, the resource server 140 may provide an access token to the application server 180. The access token may be configured to allow the application server 180 to access secure data (e.g. through the API) associated with the entity that provided consent. The indication of consent may specify a sharing permission, such as type(s) of data that the application server is permitted to access. For example, the protected data resource 150 may store various types of secure data (e.g., account balance, transactions listing, personal identification data, etc.) and the indication of consent may specify the type(s) of data that the application server 180 is to be permitted to access. The resource server 140 may configure data sharing in accordance with the sharing permission.

The access token may be issued by the resource server 140 or may be issued by a separate system (referred to as a token service provider, or TSP), which may issue tokens on behalf of the resource server 140. The access token represents the authorization of a specific third-party server to access specific parts of the secure data. The access token may, for example, be an OAuth token or a variation thereof. OAuth is an open standard for token-based authentication and authorization on the Internet. The OAuth 1.0 protocol was published as RFC 5849 and the OAuth 2.0 framework was published as RFC 6749 and bearer token usage as RFC 6750. All of these documents are incorporated herein by reference.

The client device 110, the resource server 140, and the application server 180 may be in geographically disparate locations. Put differently, the client device 110 may be remote from one or both of the resource server 140 and the application server 180.

The client device 110, the resource server 140, and the application server 180 are computer systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
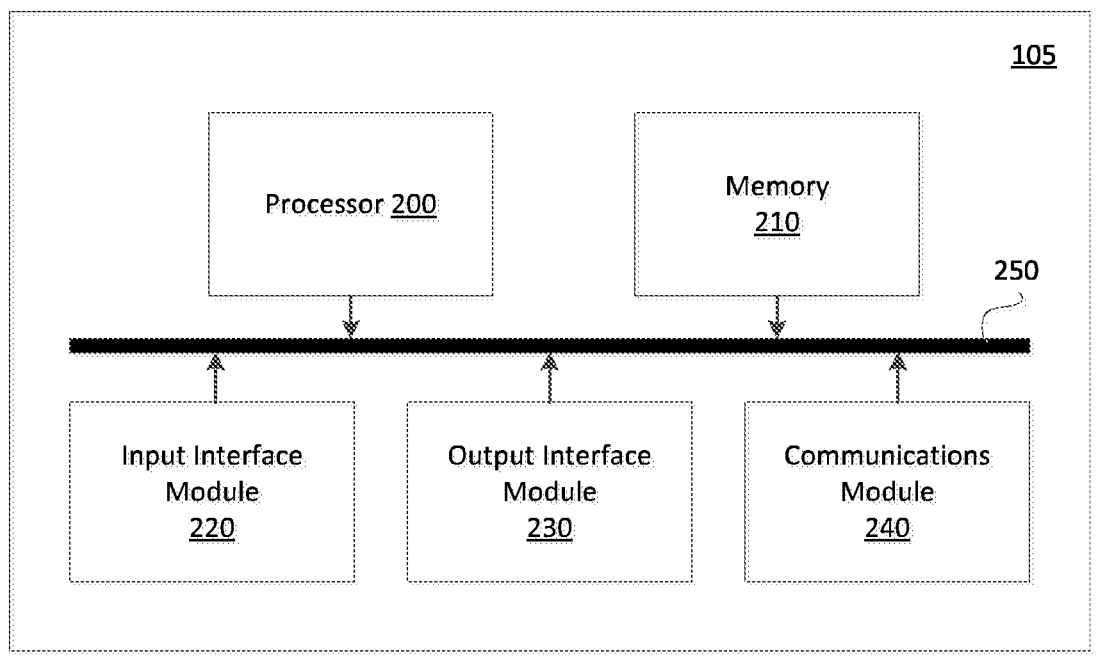
FIG. 2 is a high-level schematic diagram of an example computing device.

FIG. 2 is a high-level operation diagram of the example computing device 105. In some embodiments, the example computing device 105 may be exemplary of one or more of the client device 110, the resource server 140, and the third-party application server 180. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned exemplary input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by an output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 3:
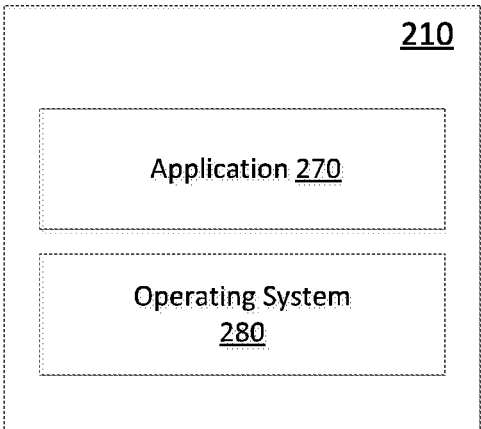
FIG. 3 shows a simplified organization of software components stored in memory of the example computing device of FIG. 2.

FIG. 3 depicts a simplified organization of software components stored in memory 210 of the example computing device 105. As illustrated these software components include an operating system 280 and an application 270.

The operating system 280 is software. The operating system 280 allows the application 270 to access the processor 200, the memory 210, the input interface module 220, the output interface module 230 and the communications module 240. The operating system 280 may be, for example, Apple's iOS™, Google's Android™, Linux™, Microsoft's Windows™, or the like.

The application 270 adapts the example computing device 105, in combination with the operating system 280, to operate as a device performing particular functions. For example, the application 270 may cooperate with the operating system 280 to adapt a suitable embodiment of the example computing device 105 to operate as the client device 110, the resource server 140, the application evaluation server 170, and the application server(s) 180.

While a single application 270 is illustrated in FIG. 3, in operation, the memory 210 may include more than one application 270, and different applications 270 may perform different operations. For example, in embodiments where the computing device 105 is functioning as a client device 110, the application 270 may comprise a value transfer application which may, for example, be a personal banking application. The value transfer application may be configured for secure communications with the resource server 140 and may provide various banking functions such as, for example, display of account balances, transfers of value (e.g. bill payments, money transfers), and other account management functions.

Reference is made to FIG. 4, which shows, in flowchart form, an example method 400 of providing a user interface on a client device. The operations of method 400 may be performed in presenting a user interface for navigating account data for one or more remotely hosted user accounts. For example, the method 400 may be implemented in providing the user interface for a banking application which accesses personal bank account data of a user associated with the client device.

Operations 402 and onward may be performed by one or more processors of a computing device such as, for example, the processor 200 (FIG. 2) of one or more suitably configured instances of the example computing device 105 (FIG. 2). In at least some embodiments, the method 400 may be performed by a server system. In particular, a server (such as resource server 140) which has access to a protected data resource and which is communicably connected to a client device associated with a user that has an account in the protected data resource may perform the operations of method 400.

In operation 402, the server performs a first data transfer from a user account of the protected data resource. For example, the first data transfer may be a payment transfer from the user account to another (recipient) account. In at least some embodiments, the first data transfer may be performed in response to receiving a request from a client device associated with the user account. For example, the request may be received from an application on the client device that is authorized for interacting with the user account. The request may be received directly from the application, or it may be received from a server, such as application server 180 of FIG. 1, that is associated with the application. The request from the application may, for example, be in the form of a request to an API ("API call") for interfacing with the protected data resource.

In operation 404, the server updates an interaction model for the user account based on the first data transfer. An interaction model for a user account is a representation of an individual's interactions with the user account. "Interactions" may include account operations, settings, and preferences for the user account. For example, account operations for a user account that are initiated by an individual may be modelled by an interaction model. As another example, settings and preferences that are set by an individual for a user account may also be modelled by an interaction model. More generally, an individual's actions which affect a user account may be captured by a customized interaction model for the user account.

In at least some embodiments, the server is configured to create, build, and maintain an interaction model for a user account. When a user account is created in a protected data resource, a corresponding interaction model may be created. The interaction model is associated with a specific account of the protected data resource and a specific user associated with the account (e.g. owner of the account). Once created, the interaction model may be built up by recording the user's actions that are associated with the account. In particular, the server may build the interaction model by adding details of various user actions for the account.

In some embodiments, the interaction model may comprise a data structure which is dynamically updated based on the user's actions that are detected. For example, the interaction model may be a database that is stored at the server, and which is updated to include data associated with the user's account operations, settings, preferences, etc. for the user account. When a user configures a setting for the user account or conducts an account operation, the interaction model may store a new data record (or entry) corresponding to the specific user action.

In the context of a personal banking account, a user can initiate various account operations, such as bill payments, money transfers, cheque deposits, and stock trading, which affect the account balances of the account. An interaction model for the user's bank account may include details of the account operations, such as type of operation, identity of a receiving entity, time stamp, amount of payment/transfer, identity of stocks traded, trade volume, etc. A user can also configure settings and preferences for the user's bank account. For example, limits or conditions on transactions, withdrawal, overall spending, etc. can be set (e.g. using a banking application) and independently enforced. An interaction model may indicate limits, conditions or other such settings for the bank account.

The interaction model may be organized in various different ways. In some embodiments, an interaction model may include definitions for one or more user "intents", which represent actions that can be taken for the user account. A user action may be associated with at least one user intent. Intents can optionally have arguments, or "slots". Slots may be defined with different types in the interaction model. For example, a "transfer" intent, corresponding to a transfer action for a user account, may be defined for an interaction model, with slots representing a "sender account" and a "recipient" (e.g. recipient account ID). When a user requests to a server to "transfer $50 to John Smith from chequing account", the interaction model may be updated to support the transfer intent with the value "chequing account" for the sender account slot and "John Smith" for the recipient slot. In particular, the interaction model saves the information associated with the user's transfer action for the user account.

An interaction model may also include sample utterances that specify the words and phrases that users can input to invoke intents. In at least some embodiments, each intent may be mapped to a set of one or more utterances. The server can employ various speech (or text) recognition techniques to recognize utterances from a user's speech/text input and identify suitable intents from the inputted speech/text.

An interaction model for a user account may be updated automatically in response to the server detecting user actions that are associated with the user account. The server can access the interaction model when responding to queries for account data for the user account. A dynamically updated interaction model may facilitate providing responses to queries for account data in real-time. In particular, the server can provide real-time responses to queries that are based on user actions (e.g. account operations, settings, etc.) represented in the interaction model.

The interaction model may also be updated to include various options that are associated with the first data transfer (and more generally, other user actions for the user account). For example, the interaction model may be configured to support options for initiating data transfers, converting money into different currency, transferring money between accounts, ordering cheques, or viewing summaries of previous transfers. By adding such options for account operations, the capacity of the interaction model to support responses to queries for user account data can be expanded.

The server receives, from a client device associated with the user account, a query, in operation 406. The query includes at least one query term. The query may be inputted via the user interface of an application on the client device. For example, the user may input a text-based query in a user interface element, such as a free-form search box, that is included in the graphical user interface of an application. The application may be any application that has access to account data for the user account. In particular, the application may be authorized to query the protected data resource for account data for a user account associated with a user of the client device. The application may itself perform text processing on the query input, or simply transmit the query to the server for processing.

In some embodiments, the user query may be received via other input devices. For example, a voice command device, such as a smart speaker, may be used to input a query for user account data. A smart speaker typically has a built-in microphone for collecting audio input. Based on received audio input, a smart speaker can offer various interactive actions and hands-free activation. A user query for account data may be received via a smart speaker, in operation 406, and transmitted to the server.

In operation 408, the server determines, based on the interaction model and the query, that the query maps to a user intent associated with the first data transfer. That is, the query is determined to relate to an intent associated with a specific user action (i.e. first data transfer). In at least some embodiments, the server may perform text processing (e.g. natural language processing, or NLP) on the inputted query. The server may, for example, identify keywords associated with the query based on the text processing. The keywords of the query can then be textually compared to user intents that are stored in association with the different user actions of the interaction model to determine whether there is a match.

If the server determines that a mapping exists between a user's query and an intent associated with a user action, it may be an indication that the intent and/or the user action are candidate results for the user's query. Accordingly, in response to determining that the query maps to a user intent associated with the first data transfer, the server provides, to the client device, a search result that is based on the first data transfer, in operation 410. In particular, the server provides, as a reply to the user's query, at least one search result that relates to one or more parameters (e.g. recipient, transfer amount, time, etc.) of the first data transfer.

In at least some embodiments, the search results to a user's query may be provided in a user interface on the client device. In particular, the server may provide the search results as part of a user interface that is displayed on the client device. For example, the search results may be displayed in a graphical user interface of an application that is used to access account data for a user account. The search results may be presented in various different orders (e.g. alphabetical, relevance, chronological, etc.) in the graphical user interface. One or more of the search results may be selectable by a user. For example, a search result may be represented by a selectable user interface element. The user interface element for a search result may be selected to display additional information relating to the search result, or to initiate one or more actions.

A search result provided in operation 410 may be an actionable option to perform a user action. For example, a search result may be an option to perform a second data transfer to a recipient associated with the first data transfer. The second data transfer may, for example, be a bill payment or an electronic money transfer to the same recipient as that of the first data transfer.

As another example, a search result provided in operation 410 may comprise a transfer history summary. The server may provide, in operation 410, a search result that represents a summary of past transfers. For example, a selectable user interface for presenting a summary of transfers may be displayed. The summary may include information relating to past transfers to a recipient that is associated with the first data transfer. In some embodiments, the user query may indicate a specific time period, and the transfer history summary may be a summary of only those transfers which occurred during the specified time period. For example, a user may input the query "how much have I spent at Starbucks in the past month", which specifies a recipient ("Starbucks") and a time period ("previous thirty days"). In response to receiving such a query, the server may provide, to the client device, a summary of spending at Starbucks over the past month as a search result.

While the method 400 is described with reference to data transfers, the method 400 may apply equally well to other user actions. More generally, the method 400 may be implemented in providing a user interface for navigating data relating to various user actions that are associated with a user account. In particular, the operations of the method 400 may be performed in providing a user interface for presenting search results to queries which map to various user actions that are associated with a user account.

For example, the method 400 may be applicable to account operations that are initiated by a user. Account operations, such as currency conversion, cheque deposits, and inter-account transfers, may cause an interaction model associated with the user account to be updated. For example, the interaction model may be updated to support a new intent for converting a quantity of money to a particular currency. Upon updating the interaction model based on performing a first account operation, the server may receive a query from the client device. The query may be received, for example, via a graphical user interface of an application (e.g. free-form search box) on the client device or an independent voice command device, such as a smart speaker.

The server then determines, based on the interaction model and the query, that the query maps to a user intent associated with the first account operation. In response, the server provides, to the client device, search results that are based on the first account operation. Examples of search results include selectable options to: initiate a data transfer (e.g. bill payments), lock a value transfer card (e.g. lock a credit card to prevent its use), exchange money into a foreign currency, transfer money between accounts, order cheques, or view a summary of previous transfers to a particular recipient.

In at least some embodiments, the search results that are provided in reply to a user query depend on the identity of the user that inputs the query. In other words, the server may present different search results to the same query for different users. When the server receives a user query, the server may determine the identity of a user associated with the query. For example, the server may determine whether a user has logged in to the server for access to a specific user account of the protected data resource. Upon identifying the user associated with the query, the server may provide, to the client device associated with the user, search results that are specific to that user. In particular, the server may access an interaction model for the user account to which the user has authenticated and provide search results based on that interaction model. If no login is detected, the server may prompt for input of login credentials. For example, a prompt to input login credentials for logging into a user account at the protected database may be provided on a client device associated with the user.

Figure 5:
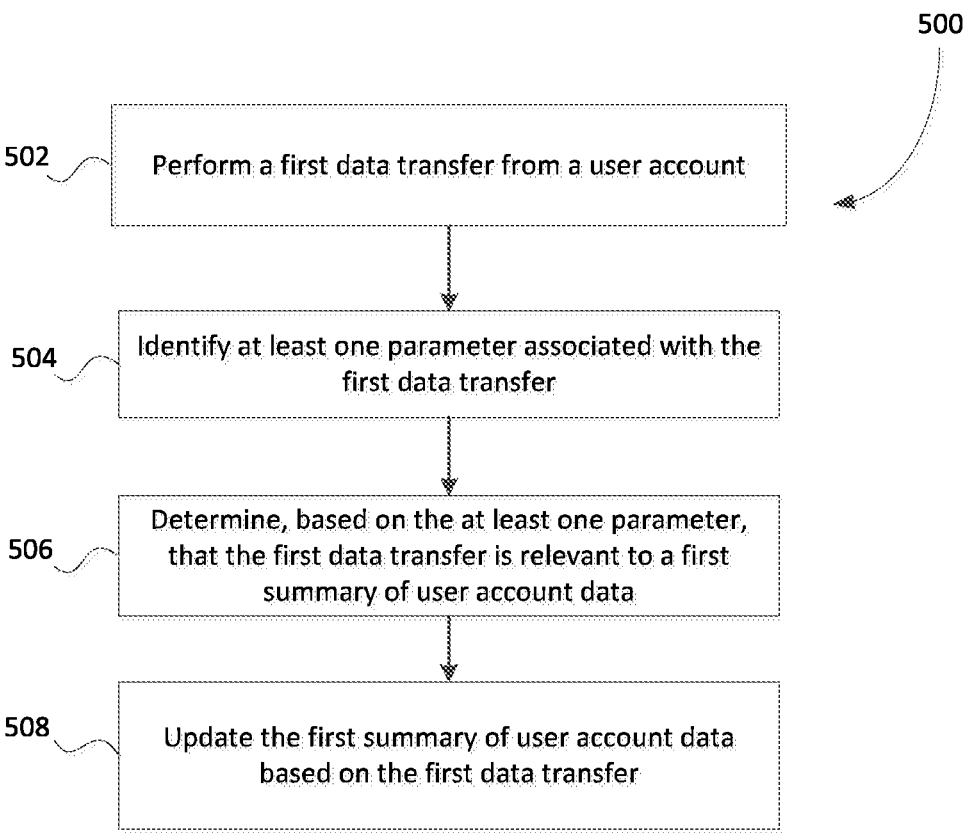
FIG. 5 shows, in flowchart form, an example method for providing a summary of user account data based on a user action associated with the user account.

Reference is made to FIG. 5, which shows, in flowchart form, an example method 500 of providing a user interface on a client device. The operations of method 500 may be performed in presenting a user interface for navigating account data for one or more remotely hosted user accounts. For example, the method 500 may be implemented in providing the user interface for a banking application which accesses personal bank account data of a user associated with the client device.

Operations of the method 500 may be performed by one or more processors of a computing device such as, for example, the processor 200 (FIG. 2) of one or more suitably configured instances of the example computing device 105 (FIG. 2). In particular, a server (such as resource server 140) which has access to a protected data resource and which is communicably connected to a client device may perform the operations of method 500.

In order to provide rapid search results for queries that request summary information, the server may be configured to automatically prepare summaries for common query types. For example, a summary may be prepared for merchants that a user transacts with frequently or on a regular basis. The summary can be automatically prepared so that it is ready to be provided immediately upon request (i.e. query by user).

In operation 502, a first data transfer from a user account is performed. The first data transfer may, for example, be a bill payment, cheque deposit, or inter-account transfer. The server identifies at least one parameter associated with the first data transfer, in operation 502. The parameters may include, for example, a sender account, recipient, transfer amount, and time period. The server may identify such parameters based on a user request that triggered the first data transfer. In particular, the server may extract one or more data fields from the user request for the first data transfer. The user request data may be stored by the server. For example, the data extracted from the user request may be recorded by the server as part of a record corresponding to the first data transfer.

The server determines, based on the at least one parameter, that the first data transfer is relevant to a first summary of user account data, in operation 506. The server may store and dynamically update a predetermined set of summaries of user account data, such as account operations data. For example, summaries that are maintained by the server may be classified by recipients (e.g. merchants), time periods, and/or sender accounts (e.g. checking or savings account) associated with various different account operations. The server may compare the value of the at least one parameter to data fields associated with the summaries and based on the comparisons, the server may identify one or more of the summaries for which the first data transfer is relevant.

The server then updates the first summary of user account data based on the first data transfer, in operation 508. In this way, the first summary is updated based on details of the first data transfer. More generally, the server can dynamically update a predetermined set of summaries by automatically preparing updated summaries based on user actions, such as account operations or changes to settings or preferences associated with the user account.

Reference is made to FIG. 6, which shows, in flowchart form, another example method 600 of providing a user interface on a client device. The operations of method 600 may be performed in presenting a user interface for navigating account data for one or more remotely hosted user accounts. For example, the method 600 may be implemented in providing the user interface for a banking application which accesses personal bank account data of a user associated with the client device.

As explained above, an interaction model for a user account may be updated based on user actions associated with the account. The structure of the interaction model has a significant effect on the way the model is built. In at least some embodiments, an interaction model may define a plurality of intents, which are associated with user actions for an account, and arguments for those intents. By building the interaction model using intents and arguments, the model can be grown in a systematic way that is tractable and convenient.

In operation 602, the server performs a first data transfer from a user account. It will be understood that the method 600 applies equally well in the context of other user actions (e.g. account operations). The server identifies a user intent associated with the first data transfer, in operation 604. For example, the server may determine, based on a user request that triggered the first data transfer, that the type of user action requested is a data transfer, or simply "transfer". The user request indicates the type of user action that is being requested by the user, and the server may extract that information and use it as a proxy for a user intent associated with the first data transfer. In some embodiments, the type of user action requested may be matched with one or more predefined user intents. For example, various known types of user actions may be mapped to predefined user intents, and the server may identify user intent(s) associated with the first data transfer based on such mapping.

The server may then determine whether the user intent associated with the first data transfer already exists in the interaction model, in operation 608. If the interaction model does not include the identified user intent, the server adds support for the user intent to the interaction model, in operation 610. For example, a new record associated with the user intent may be created in the interaction model. The newly created record may contain data associated with the first data transfer, such as sender account, recipient, and transfer amount. In particular, the data associated with the first data transfer may be added to the interaction model as arguments corresponding to the newly created user intent. For example, one or more of the sender account, recipient, and transfer amount data fields may be added as arguments for the new user intent.

If, on the other hand, the user intent does already exist in the interaction model, the server identifies an argument associated with the first data transfer, in operation 612. The server then determines, in operation 614, whether the argument already exists in the interaction model in association with the existing user intent. If the argument does not exist for the user intent, the server may add a new argument for the existing user intent in the interaction model, in operation 618. For example, the server may record the new user intent in a record associated with the existing user intent in the interaction model. If the argument does exist for the user intent, the server may simply proceed to update the interaction model based on details of the first data transfer. That is, the interaction model is updated to include the values associated with the first data transfer for the existing arguments in the interaction model.

Reference is made to FIG. 7, which shows, in flowchart form, another example method 700 of providing a user interface on a client device. The operations of method 700 may be performed in presenting a user interface for navigating account data for one or more remotely hosted user accounts. For example, the method 700 may be implemented in providing the user interface for a banking application which accesses personal bank account data of a user associated with the client device.

The method 700 illustrates providing search results for user actions associated with a value transfer card for a user account. When a value transfer card, such as a credit card, is activated in operation 702, the interaction model for the account is updated based on the value transfer card, in operation 704. That is, functions associated with the value transfer card may be added to the interaction model. For example, the interaction model may be updated to add support for a user intent to lock the value transfer card. Upon receiving a further query from a client device associated with the user account in operation 706, the server determines, based on the interaction model and the further query (e.g. one or more query terms of the further query), that the further query maps to a user intent associated with the value transfer card, in operation 708. In response to determining that the further query maps to the user intent, the server provides one or more search results to the further query based on the value transfer card. For example, a search result provided to the client device may be a selectable option (e.g. selectable user interface) representing an account operation of locking the value transfer card.

Reference is made to FIGS. 8A-8D, which show example pages 800A-800D of a graphical user interface of an application for accessing user account data. The application depicted in FIGS. 8A-8D is a banking application which accesses personal banking information for a user. As shown in page 800A, a user query may be input into a user interface element, such as the search box 802, of the banking application. As the user inputs text into the search box 802, the graphical user interface of the application is updated to display search results corresponding to the inputted text. The search results are those that are returned by the server based on an interaction model for the user's bank account, as described above with reference to methods 400 to 700. The displayed list of search results is updated as more text is input into the search box 802.

A displayed search result may have an associated user interface element, such as the icon 804, which facilitates selection of the search result. The user can activate a cursor 806 or select by a touch input one of the displayed search results. The selected search result may, for example, be shown in highlight, as in FIG. 8B. Depending on the number of search results, the graphical user interface may show only a limited number of the search results along with a user interface element 810 for showing more results.

Figures 8A, 8B:
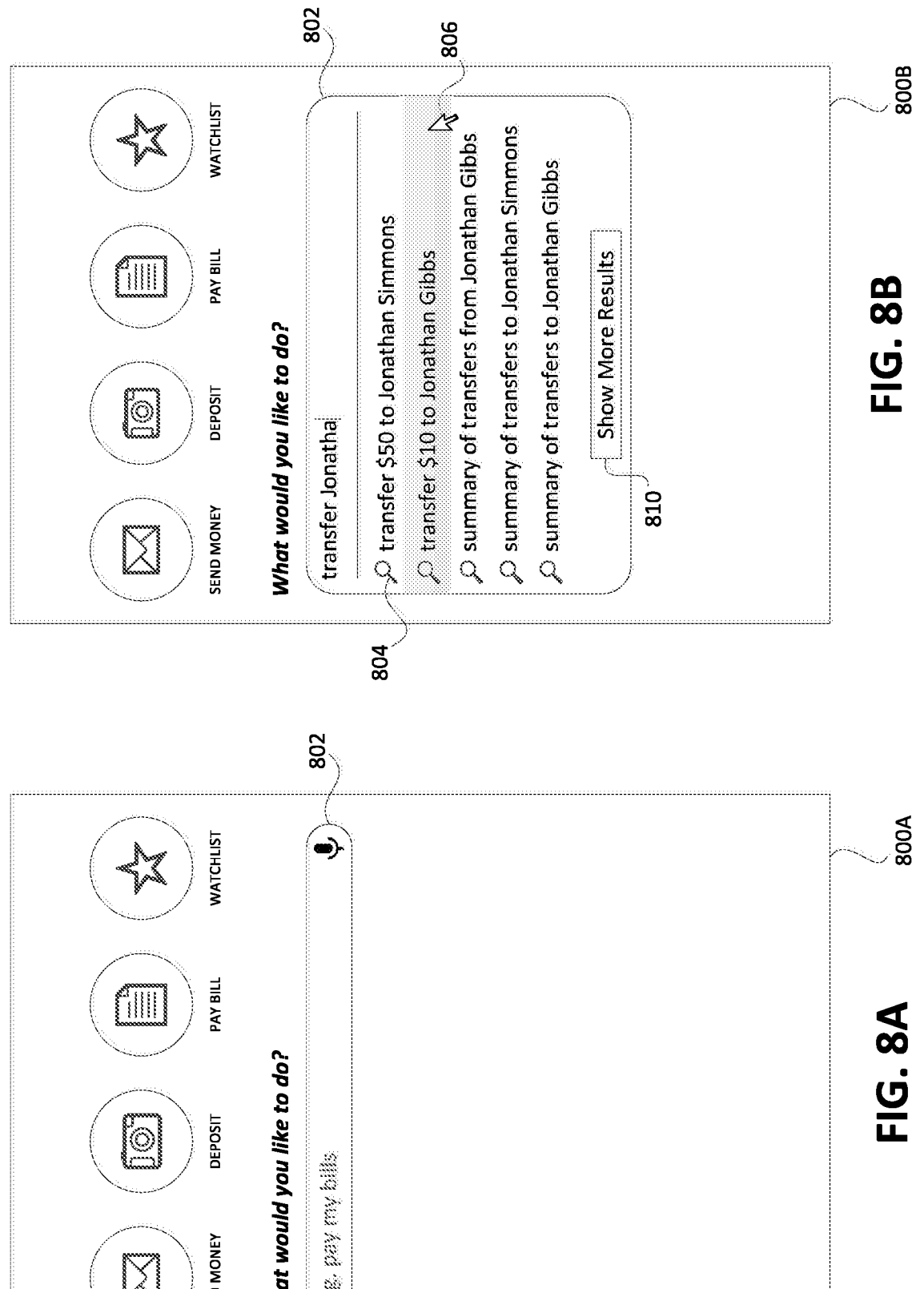
FIGS. 8A-8D show example pages of a graphical user interface of an application for accessing user account data.
Figure 8D:
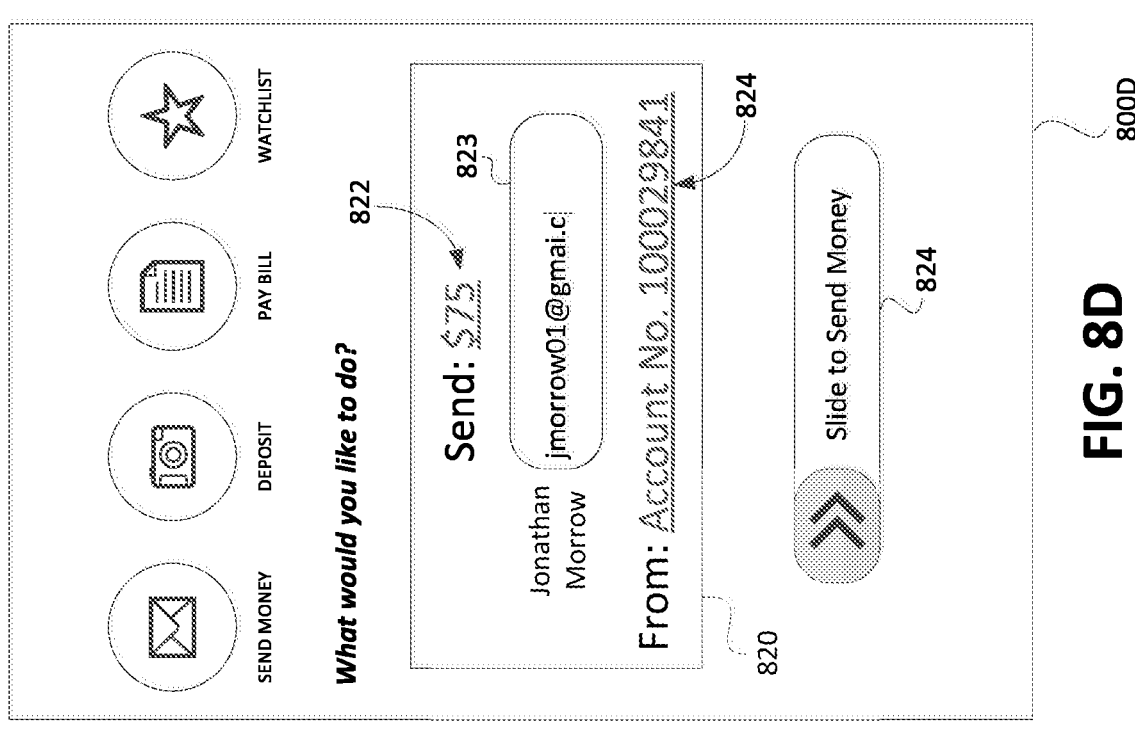
Figure 8C:
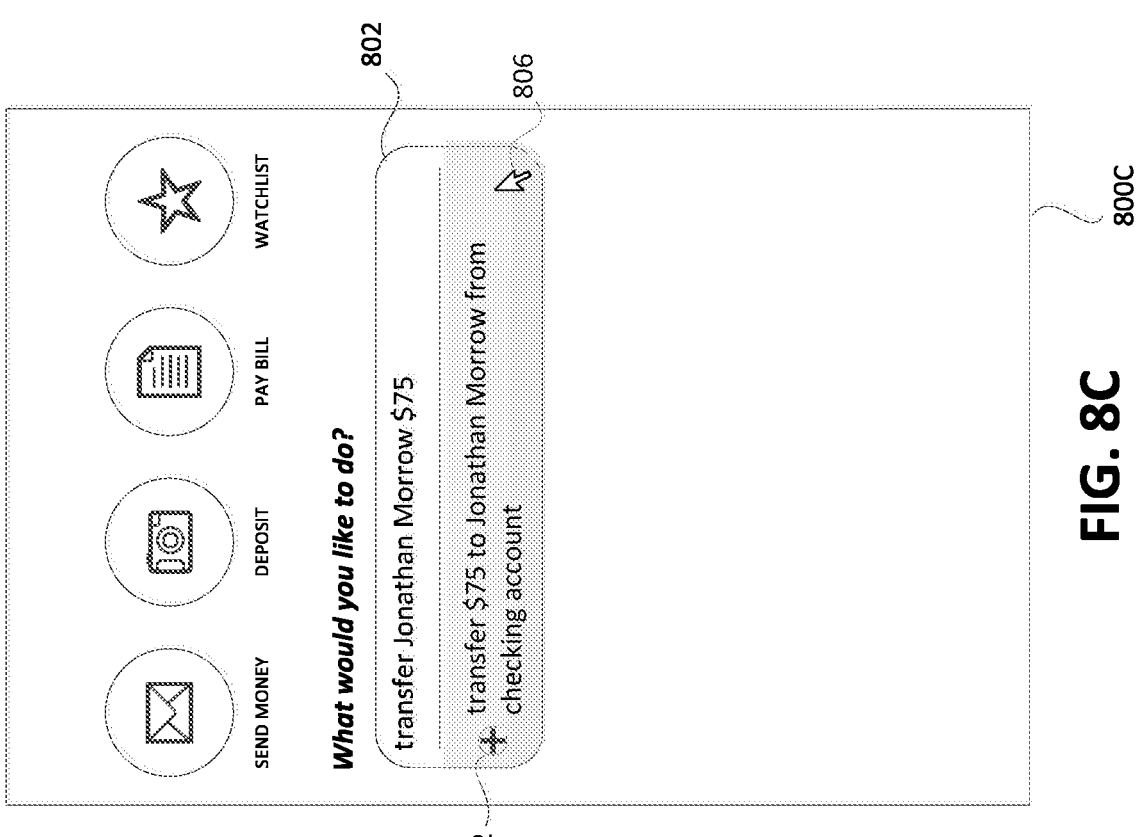

FIG. 8C shows an example of a scenario in which a suggested user intent and corresponding arguments are provided for an inputted user query. When a user query is associated with a user intent or arguments that do not already exist in the interaction model for the user account, the graphical user interface may be updated to provide suggestions for adding a new user intent and corresponding arguments. In the example illustrated in FIG. 8C, a new user intent for "transferring to Jonathan Morrow" is suggested to be added, with arguments "$75" and "checking account" (as sender account). The user interface element 812 can be selected to add the new user intent and associated arguments to the interaction model.

Upon selection of a highlighted search result from the displayed list of search results, a suitable application action may be initiated. FIG. 8D illustrates an example of a user action page 800D which may be displayed in response to selection of one of the displayed search results to a user query. As shown in FIG. 8D, a user action page for confirming the selected "transfer $75 to Jonathan Morrow from checking account" operation is displayed. The information corresponding to the selected search result is presented in the area 820. The values for the data fields 822, 823 and 824 may be editable, to facilitate making changes to a suggested account operation. When the user is ready to confirm the details of the user action corresponding to the selected search result, the user can activate a user interface element, such as slider 824, to complete the action.

The example embodiments of the present application have been described above with respect to applications that are resident on a user's client device. It should be noted, however, that the disclosed systems and methods may be applicable more generally for providing user interfaces of various different types of applications or services. For example, the applications may be cloud-based applications that are available to users on-demand via a computer network (e.g. Internet), or web-based applications that are hosted on the web and run in a web browser.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:

a processor; and a memory coupled to the processor, the memory storing processor-executable instructions that, when executed by the processor, are to cause the processor to:

perform a first data transfer for transferring data from a user account to a recipient account;

update an interaction model for the user account based on the first data transfer, the interaction model comprising a database stored in the memory and including data records containing definitions of user intents associated with account operations that are initiated in connection with the user account and arguments associated with the user intents, and wherein updating the interaction model comprises:

configuring the interaction model to:

store, in the database, a new data record containing user intent data associated with a new data transfer intent associated with the first data transfer for transferring data from the user account to a recipient account; or update an existing data record associated with a first user intent defined in the interaction model based on adding one or more parameters of the first data transfer as new arguments for the first user intent; and in response to determining that an incoming query at a client device maps to a user intent associated with the first data transfer defined in the updated interaction model, provide, to the client device for display in a search result user interface, at least one actionable search result for initiating a second account operation defined by one or more parameters stored in the interaction model in association with the first data transfer.

2. The computing system of claim 1, wherein the new data transfer intent or the new argument indicates a recipient associated with the first data transfer.

3. The computing system of claim 1, wherein the search result includes a transfer history summary for transfers to a recipient associated with the first data transfer.

4. The computing system of claim 3, wherein the query indicates a time period and wherein the transfer history summary is associated with the time period.

5. The computing system of claim 1, wherein input of the query is received via a free-form search box displayed on the client device.

6. The computing system of claim 1, wherein the client device includes a smart speaker.

7. The computing system of claim 1, wherein the instructions, when executed, are to further cause the processor to:

activate a value transfer card;

update the interaction model for the account based on the value transfer card;

receive, from the client device, a further input representing a further query having at least one query term;

determine, based on the interaction model and the at least one query term of the further query, that the further query maps to a user intent associated with the value transfer card; and in response to determining that the further query maps to a user intent associated with the value transfer card, provide a search result based on the value transfer card.

8. The computing system of claim 7, wherein updating the interaction model for the account based on the value transfer card comprises adding support for a user intent to lock the value transfer card and wherein the search result is a selectable option to lock the value transfer card.

9. The computing system of claim 1, wherein the second account operation comprises a data transfer from the user account to the recipient account.

10. The computing system of claim 1, wherein configuring the interaction model comprises adding one or more parameters associated with the first data transfer as arguments for a user intent of the interaction model.

11. A processor-implemented method, comprising:

performing a first data transfer for transferring data from a user account to a recipient account;

updating an interaction model for the user account based on the first data transfer, the interaction model comprising a database stored in the memory and including data records containing definitions of user intents associated with account operations that are initiated in connection with the user account and arguments associated with the user intents, and wherein updating the interaction model comprises:

configuring the interaction model to:

store, in the database, a new data record containing user intent data associated with a new data transfer intent associated with the first data transfer for transferring data from the user account to a recipient account; or update an existing data record associated with a first user intent defined in the interaction model based on adding one or more parameters of the first data transfer as new arguments for the first user intent; and in response to determining that an incoming query at a client device maps to a user intent associated with the first data transfer defined in the updated interaction model, providing, to the client device for display in a search result user interface, at least one actionable search result for initiating a second account operation defined by one or more parameters stored in the interaction model in association with the first data transfer.

12. The method of claim 11, wherein the new data transfer intent or the new argument indicates a recipient associated with the first data transfer.

13. The method of claim 11, wherein the search result includes a transfer history summary for transfers to a recipient associated with the first data transfer.

14. The method of claim 13, wherein the query indicates a time period and wherein the transfer history summary is associated with the time period.

15. The method of claim 11, wherein input of the query is received via a free-form search box displayed on the client device.

16. The method of claim 11, wherein the client device includes a smart speaker.

17. The method of claim 11, further comprising:

activating a value transfer card;

updating the interaction model for the user account based on the value transfer card;

receiving, from the client device, a further input representing a further query having at least one query term;

determining, based on the interaction model and the at least one query term of the further query, that the further query maps to a user intent associated with the value transfer card; and in response to determining that the further query maps to a user intent associated with the value transfer card, providing a search result based on the value transfer card.

18. The method of claim 17, wherein updating the interaction model for the user account based on the value transfer card comprises adding support for a user intent to lock the value transfer card and wherein the search result is a selectable option to lock the value transfer card.

19. The method of claim 11, wherein the second account operation comprises a data transfer from the user account to the recipient account.

20. The method of claim 11, wherein configuring the interaction model comprises adding one or more parameters associated with the first data transfer as arguments for a user intent of the interaction model.

\* \* \* \* \*